United States Patent [19]
Strongin et al.

[11] Patent Number: 6,075,918
[45] Date of Patent: *Jun. 13, 2000

[54] GENERATION OF AN INTERMEDIATE VIDEO BITSTREAM FROM A COMPRESSED VIDEO BITSTREAM TO ENHANCE PLAYBACK PERFORMANCE

[75] Inventors: Geoffrey S. Strongin; Yi Liu; Michael R. Tucker, all of Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/548,539

[22] Filed: Oct. 26, 1995

[51] Int. Cl.⁷ .................................................... H04N 5/76
[52] U.S. Cl. .............................. 386/68; 386/111; 348/403
[58] Field of Search ...................... 358/335, 136, 358/336; 348/411; 386/5, 37, 6, 7, 8, 68, 69, 70, 109, 111, 112, 81, 82, 125, 126, 45; 341/67

[56] References Cited

U.S. PATENT DOCUMENTS

| | | | |
|---|---|---|---|
| 5,144,425 | 9/1992 | Joseph | 358/133 |
| 5,148,272 | 9/1992 | Acampora et al. | 358/133 |
| 5,193,010 | 3/1993 | Juri et al. | 358/336 |
| 5,196,933 | 3/1993 | Henot | 358/136 |
| 5,231,384 | 7/1993 | Kuriacose | 358/141 |

(List continued on next page.)

OTHER PUBLICATIONS

Lawrence A. Rowe, et al, "MPEG Video in Software: Representation, Transmission, and Playback", Symp. on Elec. Imaging Sci. & Tech., San Jose, CA, Feb. 1994, pp. 1–11.

Stephen Ohr, Senior Editor, "Digital Video Spearheads TV and Videoconferencing Applications", Computer Design, Dec. 1994, pp. 59–64.

Peng H. Ang, et al., "Video Compression Makes Big Gains", IEEE Spectrum, Oct., 1991, pp. 16–19.

Kevin L. Gong, et al., "Parallel MPEG–1 Video Encoding", Report, University of California, Berkeley, Computer Science Division, 1994, pp. 1–14.

Dr. Richard Baker, "Standards Dominate Videoconferencing Implementations", Computer Design, Dec. 1994, pp. 66–70.

Andy C. Hung, et al., "A Comparison of Fast Inverse Discrete Cosine Transform Algorithms", Multimedia Systems, 1994, pp. 204–217.

P1180/D1, "Draft Standard Specification for the Implementations of 8×8 Inverse Discrete Cosine Transform", May 29, 1990, pp. 1–9.

(List continued on next page.)

Primary Examiner—Vu Le
Assistant Examiner—Luanne P. Din
Attorney, Agent, or Firm—Skjerven, Morrill, MacPherson, Franklin & Friel, L.L.P.

[57] ABSTRACT

A video decoder system affords playback of video information corresponding to a compressed video bitstream which demands less processor performance than would be demanded for decoding the compressed video bitstream itself. One embodiment includes preprocessing and partially decoding the compressed video bitstream, and retaining the partially-decoded information for subsequent playback. In another embodiment the compressed video bitstream is preprocessed and information useful for increasing the processing speed is retained for subsequent playback. Either embodiment may be used alone, or both may be used together. The information useful for increasing the processing speed which is retained for subsequent playback may be retained by creating an intermediate video bitstream which may include partially decoded information from the compressed video bitstream as well as the information useful for increasing the processing speed of the video information. The intermediate video bitstream may be stored on a system hard disk where it may be read much faster than if stored on a CD-ROM and may be deleted when not needed.

44 Claims, 9 Drawing Sheets

U.S. PATENT DOCUMENTS

| | | | |
|---|---|---|---|
| 5,239,308 | 8/1993 | Keesen | 341/67 |
| 5,287,420 | 2/1994 | Barrett | 382/56 |
| 5,371,547 | 12/1994 | Siracusa et al. | 348/426 |
| 5,371,611 | 12/1994 | Kato et al. | 358/456 |
| 5,386,232 | 1/1995 | Golin et al. | 348/391 |
| 5,400,075 | 3/1995 | Savatier | 348/384 |
| 5,440,345 | 8/1995 | Shimoda | 348/411 |
| 5,455,684 | 10/1995 | Fujinami et al. | 358/335 |
| 5,563,961 | 10/1996 | Rynderman et al. | 382/239 |
| 5,577,191 | 11/1996 | Bonomi | 395/502 |
| 5,610,657 | 3/1997 | Zhang | 348/415 |
| 5,617,142 | 4/1997 | Hamilton | 348/405 |
| 5,621,820 | 4/1997 | Rynderman et al. | 382/239 |
| 5,627,765 | 5/1997 | Robotham et al. | 364/514 R |

OTHER PUBLICATIONS

ISO/IEC 11172–1, "Information Technology–Coding of Moving Pictures and Associated Audio for Digital Storage Media at up to about 1, 5 Mbits/s"—Part 1: Systems, Aug. 1, 1993, pp. i–iv, 1–53.

ISO/IEC 11172–2, "Information Technology–Coding of Moving Pictures and Associated Audio for Digital Storage Media at up to about 1, 5 Mbit/s"—Part 2: Video, Aug. 1, 1993, pp. i–ix, 1–112.

ISO/IEC 11172–3, "Information Technology–Coding of Moving Pictures and Associated Audio for Digital Storage Media at up to about 1, 5 Mbit/s"—Part 3: Audio, Aug. 1, 1993, pp. i–iv, 1–150.

GENERATION OF AN INTERMEDIATE VIDEO BITSTREAM FROM A COMPRESSED VIDEO BITSTREAM TO ENHANCE PLAYBACK PERFORMANCE

CROSS-REFERENCE TO RELATED APPLICATION

This application is related to U.S. Pat. No. 5,768,536, which is incorporated herein by reference in its entirety.

BACKGROUND OF THE INVENTION

The present invention relates to decompression of digital information and, more particularly, to decompression of digital video information.

Video information requires a large amount of storage space, therefore video information is generally compressed before it is stored. Accordingly, to display compressed video information which is stored, for example, as a compressed video bitstream on a compact disk read only memory (CD ROM), the compressed video information is decompressed to furnish decompressed video information. The decompressed video information is then communicated to a display. The video information is generally stored in a plurality of memory storage locations corresponding to pixel locations on a display. The stored video information is generally referred to as a bit map. The video information representing a single screen of information on a display is called a frame. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the Moving Pictures Expert Group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition Jan. 8, 1993 which is hereby incorporated by reference in its entirety.

Frames within the MPEG standard are divided into 16×16 pixel macroblocks. Each macroblock includes six 8×8 blocks: four luminance (Y) blocks, one chrominance red ($C_r$) block and one chrominance blue ($C_b$) block. The luminance blocks correspond to sets of 8×8 pixels on a display and control the brightness of respective pixels. The chrominance blocks control the color of the frame. For each set of four pixels on the display, there is a single $C_r$ characteristic and a single $C_b$ characteristic.

For example, referring to FIG. 1, labeled prior art, a frame presented by a typical display includes 240 lines of video information in which each line has 352 pixels. Accordingly, a frame includes 240×352=84,480 pixel locations. Under the MPEG standard, this frame of video includes 44 by 30 luminance blocks or 1320 blocks of luminance video information. Additionally, because each macroblock of information also includes two corresponding chrominance blocks, each frame of video information also includes 330 $C_r$ blocks and 330 $C_b$ blocks. Accordingly, each frame of video information requires 126,720 pixels or a total of 1,013,760 bits of bit-mapped storage space for presentation on a display.

There are three types of frames of video information which are defined by the MPEG standard: intra-frames (I frame), forward predicted frames (P frame) and bi-predicted frames (B frame). An example frame sequence is shown in FIG. 2, labelled prior art, which represents one of but many possible frame sequences supported by MPEG.

An I frame, such as I-frame 20, is encoded as a single image having no reference to any past or future frame (with one minor exception not important for this discussion). Each block of an I frame is encoded independently. Accordingly, when decoding an I frame, no motion processing is necessary. However, for the reasons discussed below, it is necessary to store and access I frames for use in decoding other types of frames.

A P frame, such as P-frame 24, is encoded relative to a past reference frame. A reference frame is a P or I frame. The past reference frame is the closest preceding reference frame. For example, P-frame 24 is shown as referring back to I-frame 20 by reference arrow 29, and thus, I-frame 20 is the past reference frame for P-frame 24. P-frame 28 is shown as referring back to P-frame 24 by reference arrow 30, and thus, P-frame 24 is the past reference frame for P-frame 28. Each macroblock in a P frame can be encoded either as an I macroblock or as a P macroblock. A P macroblock is stored as a translated 16×16 area of a past reference frame plus an error term. To specify the location of the P macroblock, a motion vector (i.e., an indication of the relative position of the macroblock in the current frame to the position of the translated area in the past reference frame) is also encoded. When decoding a P macroblock, the 16×16 area from the reference frame is offset according to a motion vector. The decoding function accordingly includes motion compensation, which is performed on a macroblock, in combination with error (IDCT) terms, which are defined on a block by block basis.

A B frame (e.g., B-frames 21, 22, 23, 25, 26, and 27) is encoded relative to the past reference frame and/or a future reference frame. The future reference frame is the closest proceeding reference frame (whereas the past reference frame is the closest preceding reference frame). Accordingly, the decoding of a B-frame is similar to that of a P frame with the exception that a B frame motion vector may refer to areas in the future reference frame. For example, B-frame 22 is shown as referring back to I-frame 20 by reference arrow 31, and is also shown as referring forward to P-frame 24 by reference arrow 32. For macroblocks that use both past and future reference frames, the two 16×16 areas are averaged and then added to blocks of pixel error terms. The macroblocks from the reference frames are offset according to motion vectors.

Frames are coded using a discrete cosine transform (DCT) coding scheme which transforms pixels (or error terms) into a set of coefficients corresponding to amplitudes of specific cosine basis functions. The discrete cosine transform is used in image compression to decorrelate picture data prior to quantization. The DCT coefficients are further coded using variable length coding. Variable length coding (VLC) is a statistical coding technique that assigns codewords to values to be encoded. Values having a high frequency of occurrence are assigned short codewords, and those having infrequent occurrence are assigned long codewords. On the average, the more frequent shorter codewords dominate so that the code string is shorter than the original data.

The above described scheme using I, P, and B frames and motion vectors is often referred to as motion compensation. The pixel error terms are coded via the discrete cosine transform (DCT), quantization, and variable-length coding (VLC). Motion compensation is one of the most computationally intensive operations in many common video decompression methods. When pixels change between video frames, this change is often due to predictable camera or subject motion. Thus, a macroblock of pixels in one frame can be obtained by translating a macroblock of pixels in a previous or subsequent reference frame. The amount of translation is referred to as the motion vector. Moreover, as mentioned earlier, compression methods such as MPEG employ bi-directional motion compensation (B blocks) wherein a macroblock of pixels in the current frame is computed as the average or interpolation of a macroblock from a past reference frame and a macroblock from a future reference frame. Both averaging and interpolation are computationally intensive operations which require extensive processor resources.

Moreover, VLC decoding is also a particularly processor-intensive operation. Such decoding demands severely burden the video system processor when implemented in a general purpose processor system. Systems unable to keep up with the computational demands of decoding the compressed video information frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture.

Many video compression algorithms are designed to optimize compression ratio (or the compression efficiency) and little attention is paid to enabling playback on a machine having a lower performance level. For example, MPEG 1 was developed to enable storage and playback of 352×240 resolution video frames from then-available (today's so-called "single speed") CD-ROM drives which support transfer rates of 150 Kbytes/second. While MPEG 1 enables playback from a CD-ROM, a processor with a relatively high performance level is required to decode and display the video information. Thus, the playback rate and/or the quality of MPEG video varies greatly depending upon the processor being used. Consequently, a significant need exists for enabling high quality playback of compressed video information using processors having less than stellar performance levels.

SUMMARY OF THE INVENTION

It is an object of the current invention to provide for playback of video information corresponding to a compressed video bitstream, for a given frame rate, which demands less processor performance than previously achieved.

It is a further object of the current invention to provide for playback of video information corresponding to a compressed video bitstream, for a given picture quality, which demands less processor performance than previously achieved.

It is yet another object of the current invention to provide for playback of video information corresponding to a compressed video bitstream and to provide enhanced playback features, while demanding less processor performance than would be demanded while providing such features previously.

These and other objects are afforded by a method (and a corresponding apparatus) which in one embodiment includes preprocessing and partially decoding the compressed video bitstream, and retaining the partially-decoded information for subsequent playback. In another embodiment the compressed video bitstream is preprocessed and information useful for increasing the processing speed is retained for subsequent playback. Either embodiment may be used alone, or both may be used together.

The information useful for increasing the processing speed which is retained for subsequent playback is retained by creating an intermediate video bitstream which includes information from the compressed video bitstream as well as the information useful for increasing the processing speed of the video information. During playback the intermediate video bitstream alone is processed by a video decoder system to generate the video information.

The intermediate video bitstream may be stored on a system hard disk where it may be read much faster than if stored on a CD-ROM and may be deleted when not needed. Furthermore, the intermediate video bitstream may be generated by a preprocessor which is executed either by a user before playback or by a video provider. Nonetheless, a suitable video decoder may fall back to processing just the compressed video bitstream if the intermediate video bitstream cannot be located.

In one method embodiment of the current invention, a method of reducing processor performance requirements during playback of video information corresponding to a compressed video bitstream includes preprocessing the compressed video bitstream to generate an intermediate video bitstream different from the compressed video bitstream, said intermediate video bitstream requiring less processor performance to decode than the compressed video bitstream. The method includes storing the intermediate video bitstream for subsequent playback.

In another method embodiment of the current invention for use in a system for decoding a compressed video bitstream, a method of reducing processor performance requirements during playback of video information corresponding to the compressed video bitstream includes preprocessing the compressed video bitstream, when in a preprocess mode, to generate an intermediate video bitstream different from the compressed video bitstream. The intermediate video bitstream requires less processor performance to decode than the compressed video bitstream, and is stored for use during a subsequent playback mode. The intermediate video bitstream is then decoded, when in the playback mode, to generate the video information corresponding to the compressed video bitstream.

In an apparatus embodiment of the current invention useful in a system for generating video information corresponding to a compressed video bitstream, an apparatus includes a decoder for decoding the compressed video bitstream when in a preprocess mode. An analyzer block is coupled to the decoder for analyzing the decoded compressed video bitstream to determine ways in which processing of the compressed video bitstream may be facilitated. A formatter is coupled to the analyzer block for generating an intermediate video bitstream incorporating information from the compressed video bitstream and further incorporating said ways in which the processing of the compressed video bitstream may be facilitated.

In yet another apparatus embodiment useful in a system for generating video information corresponding to a compressed video bitstream, an apparatus for reducing processor performance requirements during playback of the video information corresponding to the compressed video bitstream includes means for preprocessing the compressed video bitstream, when in a preprocess mode, to generate an intermediate video bitstream different from the compressed video bitstream, said intermediate video bitstream requiring less processor performance to decode than the compressed video bitstream. The apparatus further includes means for storing the intermediate video bitstream for use during a subsequent playback mode, and means for decoding the intermediate video bitstream, when in the playback mode, to generate the video information corresponding to the compressed video bitstream.

DETAILED DESCRIPTION

The following description is intended to be illustrative of the invention and should not be taken to be limiting.

Figure 1:
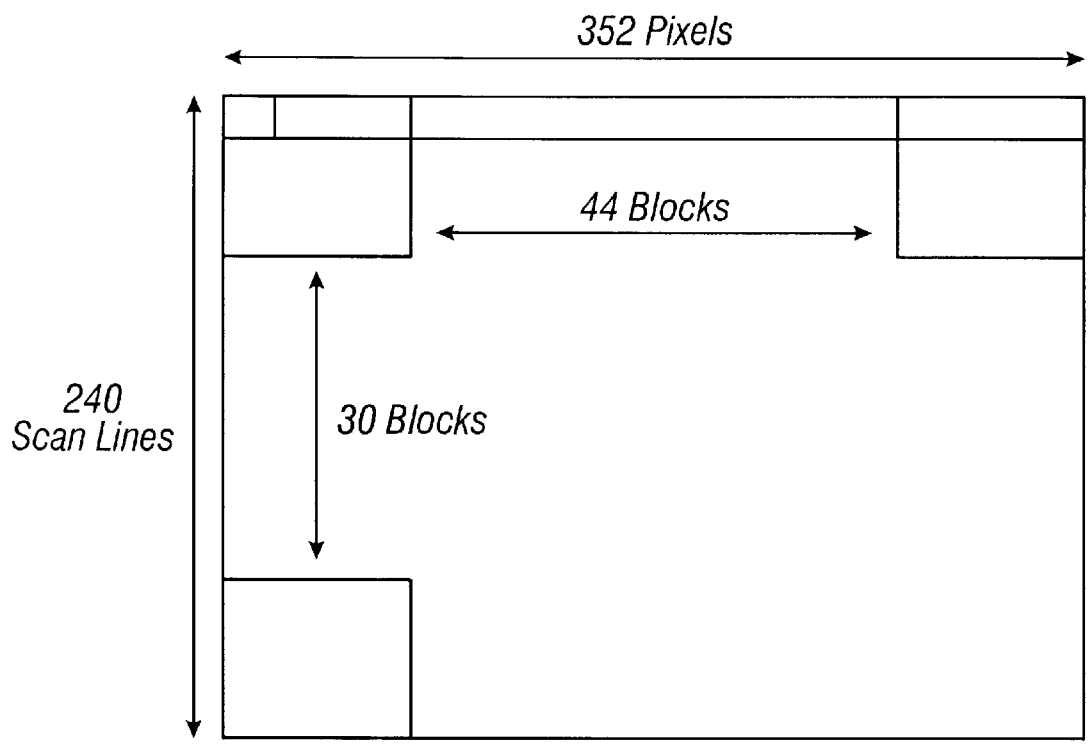
FIG. 1, labelled prior art, shows an arrangement of blocks of pixels on a display screen.
Figure 2:
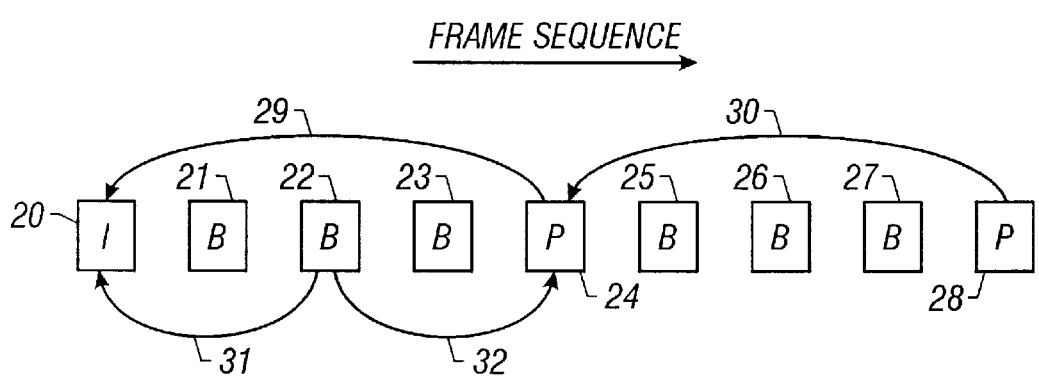
FIG. 2, labelled prior art, shows an example of an MPEG frame sequence.
Figure 3:
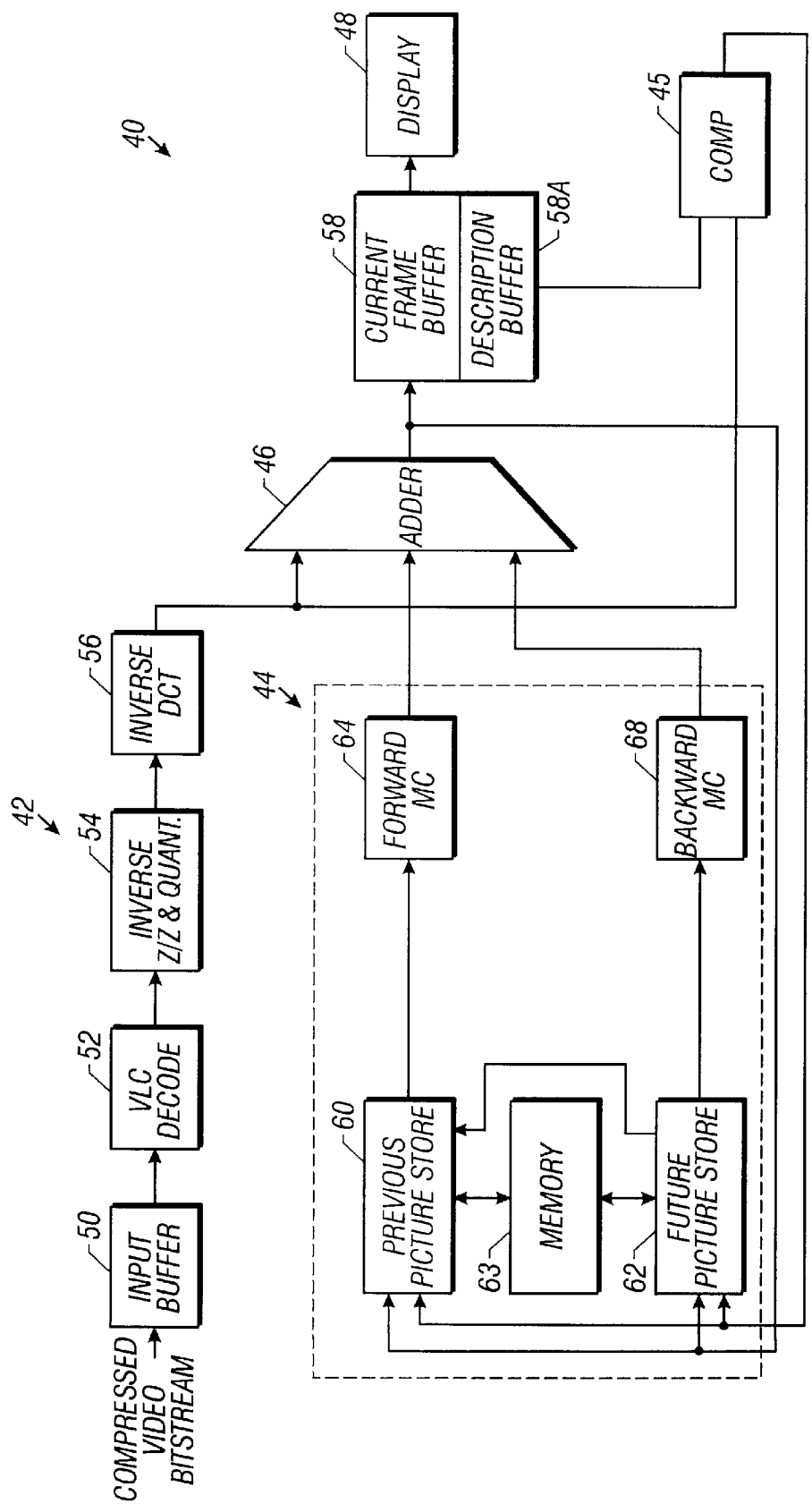
FIG. 3 shows a block diagram of a video decoder system suitable for decoding a compressed video bitstream.

A conceptual system for decompressing video information as described above is shown schematically in FIG. 3. Video system 40, which may be implemented either in hardware, software, or a combination thereof, includes input stream decoding portion 42, motion compensation block 44, adder 46, comparator 45, frame buffer 58, and display device 48. Input stream decoding portion 42 receives a stream of compressed video information and provides blocks of staticly decompressed video information to adder 46. Motion compensation block 44 receives motion information and provides motion-compensated pixels to adder 46. Adder 46 receives the staticly decompressed video information and the motion-compensated pixels and provides decompressed pixels to frame buffer 58, which then provides the information to display 48.

Input stream decoding portion 42 includes input buffer 50, variable length coding (VLC) decoder 52, inverse zig-zag and quantizer (IZZQ) block 54 and inverse discrete cosine transform (IDCT) block 56. Motion compensation block 44 includes previous picture store block 60, future picture store block 62, memory 63, forward motion compensation block 64 and backward motion compensation block 68. Frame buffer 58 captures a display frame as it is decoded and assembled macroblock by macroblock, and allows information provided by adder 46 to be rasterized prior to display by display device 48.

Input stream decoding portion 42 provides staticly decompressed pixels (such as pixel error terms) to adder 46 on a block by block basis. Additionally, forward motion compensation block 64 and backward motion compensation block 68 of motion compensation block 44 provide motion-compensated pixel values to adder 46 on a macroblock by macroblock basis. Adder 46 provides display pixel values to frame buffer 58 on a macroblock by macroblock basis until a frame is completed, which is then provided to previous picture store block 60 (in the case of an I or P past reference frame) and to future picture store block 62 (in the case of an I or P future reference frame). The operation of video system 40 is more fully described in copending commonly-assigned U.S. patent application Ser. No. 08/424,037, entitled "Video Decoder Apparatus Using Non-Reference Frame as an Additional Prediction Source and Method Therefor", filed on Apr. 18, 1995, and naming inventors Yi Liu, Michael Tucker, and Geoffrey Strongin, which application is incorporated herein by reference in its entirety.

Figure 4:
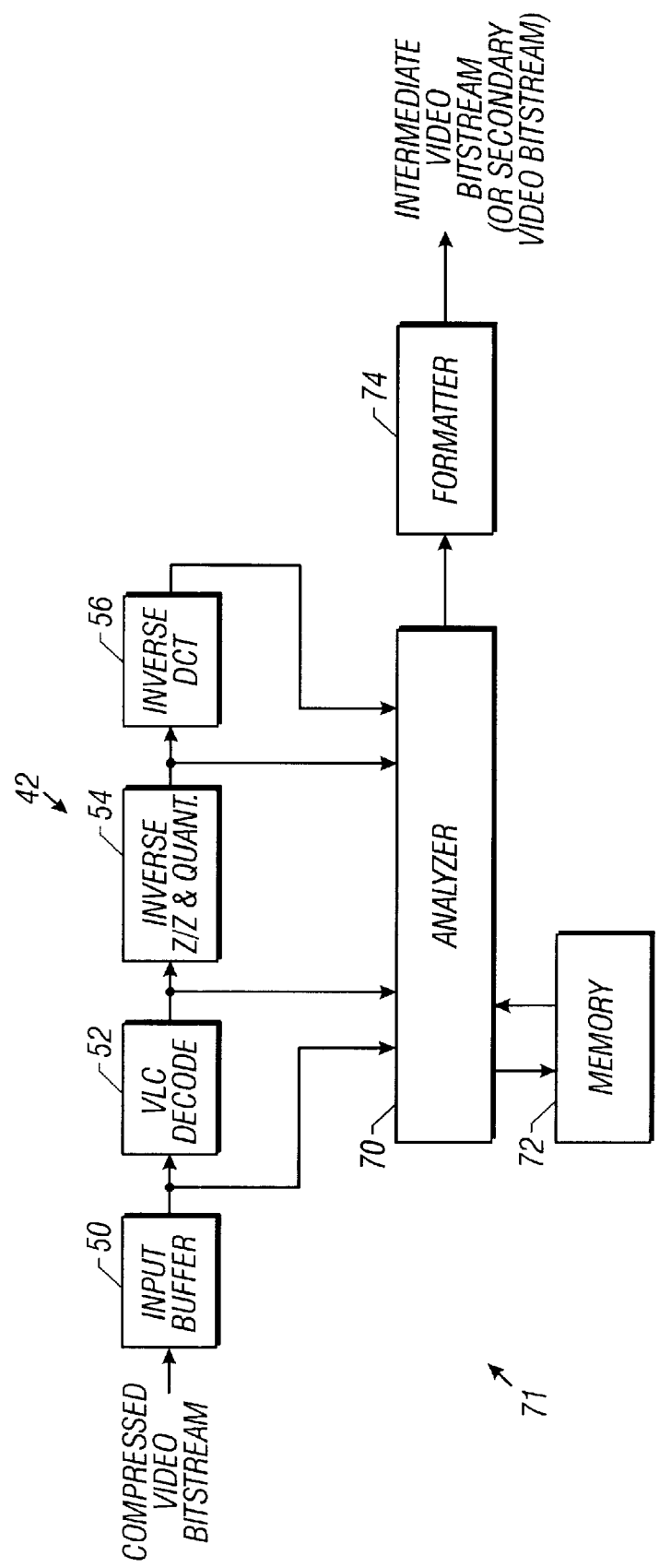
FIG. 4 shows a block diagram for a preprocessor system in accordance with one embodiment of the current invention.

A preprocessing system 71 in accordance with the current invention and useful for generating either an intermediate video bitstream or a secondary video bitstream is shown in FIG. 4. Input stream decoding portion 42, as before, includes input buffer 50, VLC decoder 52, IZZQ block 54 and IDCT block 56. An analyzer block 70 receives information from each of input buffer 50, the VLC decoder 52, the IZZQ block 54 and the IDCT block 56 and communicates with memory 72. Lastly, a formatter 74 receives information from the analyzer block 70 and produces the chosen video bitstream (either a secondary video bitstream or an intermediate video bitstream).

In operation, input buffer 50 receives a compressed video signal (or bitstream) from a video signal source such as a CD ROM (not shown); the compressed video signal is provided as a stream of compressed video information. Input buffer 50 buffers this compressed video signal to compensate for the speed which the signal is provided by the video source. This buffered compressed video signal is provided to VLC decoder 52 which decodes the variable length coded portion of the compressed signal to provide a variable length decoded signal to IZZQ block 54 which decodes the variable length decoded signal to provide a zigzag decoded and dequantized signal. This zig-zag decoded and dequantized signal is then provided to IDCT block 56 which performs an inverse discrete cosine transform on the zig-zag decoded and dequantized video signal on a block by block basis to provide a block of staticly decompressed pixel values. The inverse zig-zag and quantization compensates for the fact that while a compressed video signal is compressed in a zig-zag fashion, the zig-zag decoded and dequantized signal is provided to IDCT block 56 as sequential blocks of information. Accordingly, this zig-zag decoded and dequantized signal provides blocks to macroblocks which are in the order required for raster scanning across a display.

The analyzer block 70 receives information from each of these blocks within the input decoding portion 42 and analyzes the information to determine ways in which the processing speed of the video information may be increased. The analyzer 70 also receives the output of each of the previous blocks within input decoding portion 42, which affords the ability to encode partially-decoded video information within a generated intermediate video bitstream. The memory 72 is utilized by analyzer 70 to store motion vectors and other necessary information from previous frames.

Figure 5:
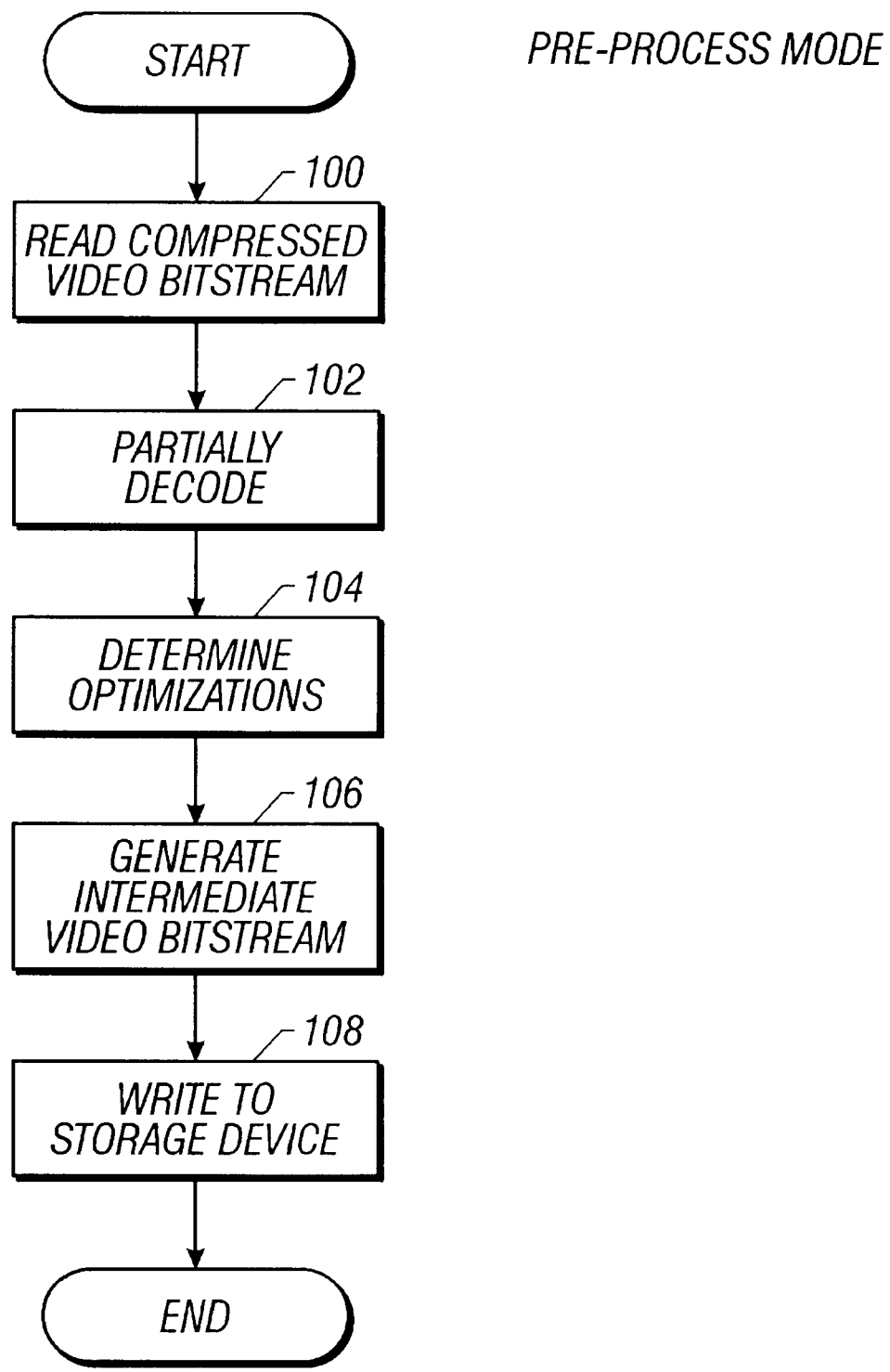
FIG. 5 illustrates a flow chart depicting one embodiment of a method for preprocessing a compressed video bitstream to generate an intermediate video bitstream.
Figure 6:
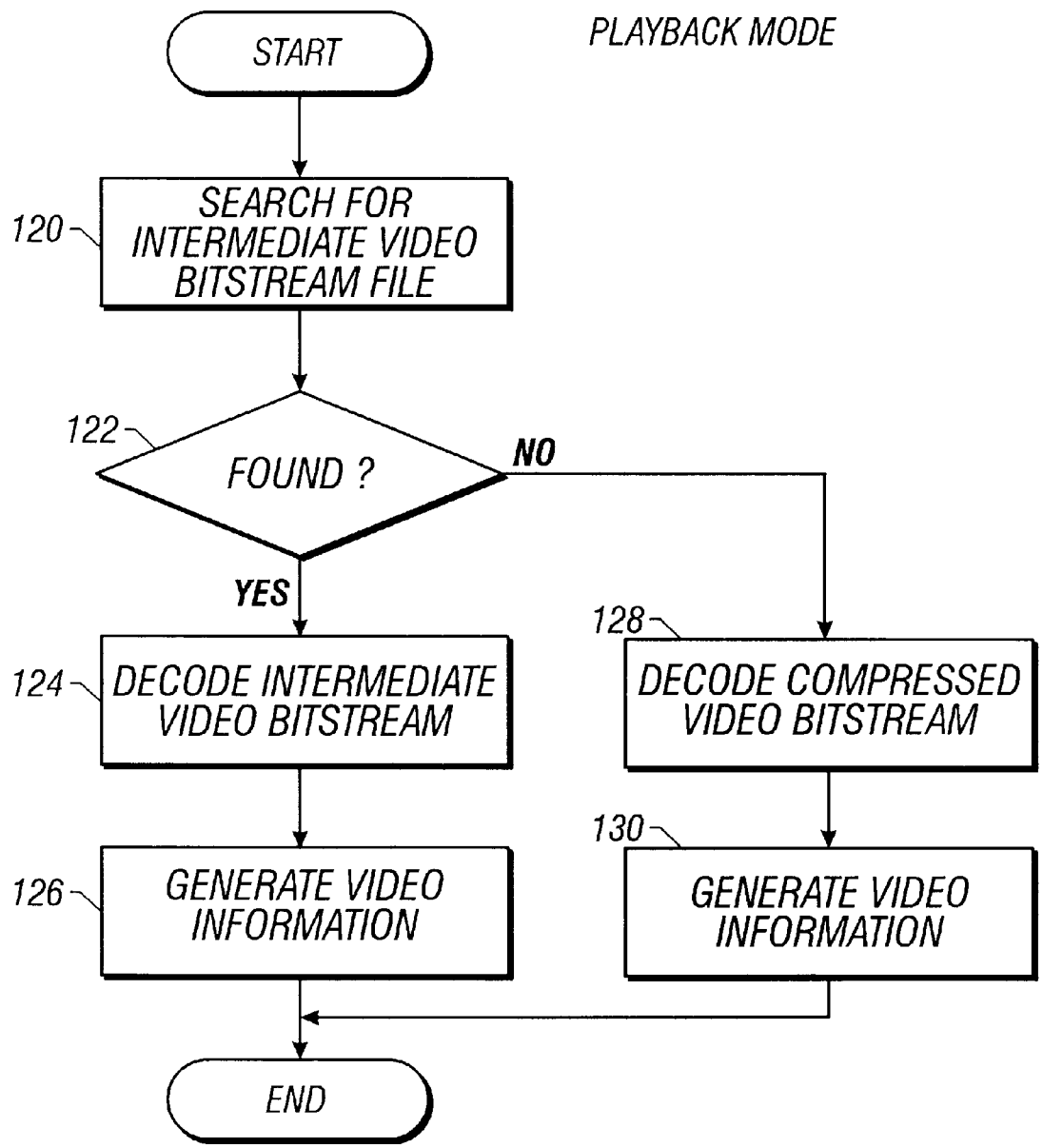
FIG. 6 illustrates a flow chart depicting one embodiment of a playback method utilizing an intermediate video bitstream.

A method for reducing the processor performance required to display video information corresponding to a compressed video bitstream by using an intermediate video bitstream is described by the flowcharts shown in FIGS. 5 and 6. Referring to FIG. 5 which describes a Preprocess (or Profile) Mode, a video processor, such as for example video preprocessor 71, first reads the compressed video bitstream, such as an MPEG bitstream, at step 100. The compressed video bitstream is partially decoded at step 102. An example of such a partial decoding includes converting the VLC codes into fixed-length codes. At step 104, the partially-decoded video bitstream is analyzed to determine ways in which the processing may be optimized to reduce processor requirements during a subsequent video decoding operation. Next, at step 106 an intermediate video bitstream is generated which is less demanding of processor performance to decode than the original compressed video bitstream. Lastly, at step 108, the intermediate video bitstream is written to a storage device, so that it may be read and decoded during a subsequent playback operation.

FIG. 6 shows a flowchart describing a playback mode corresponding to the preprocessing mode shown in FIG. 5. At step 120 the method first searches for an intermediate video bitstream that may be stored on a storage device as a result of a previous preprocessing mode operation. Step 122 tests for such a search, and if an intermediate video bitstream file is found, then control proceeds to step 124, at which step the intermediate video bitstream is decoded, followed by the step of generating the video information for display at step 126. Alternatively, if at step 122 the intermediate video bitstream is not found, then control proceeds to step 128, at which step the compressed video bitstream is decoded, followed by the step of generating the video information for display at step 130.

Figure 7:
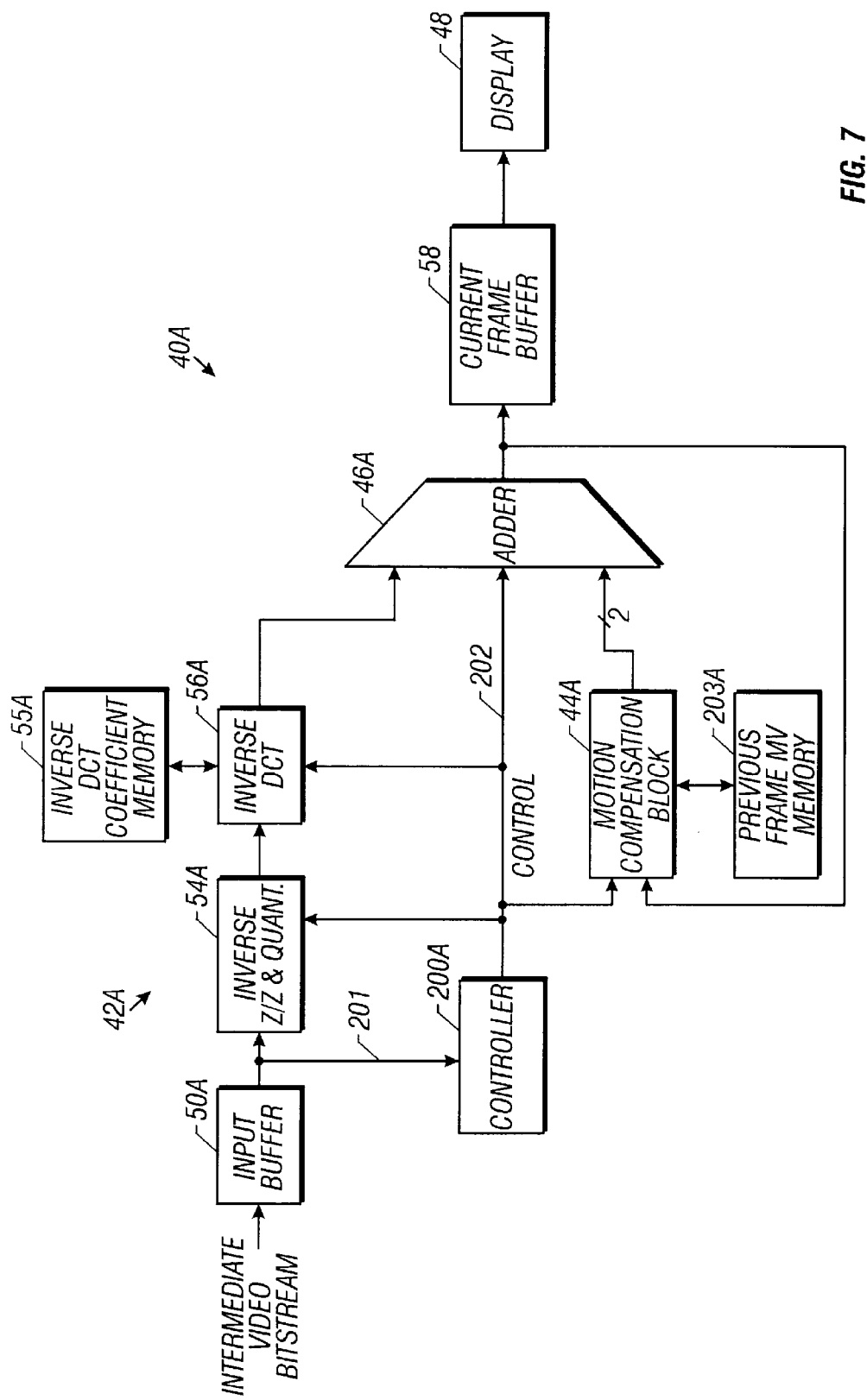
FIG. 7 shows a block diagram of a video decoder system suitable for decoding an intermediate video bitstream.

A conceptual system for decoding an intermediate video bitstream as described above is shown schematically in FIG. 7. Video system 40A, which may be implemented either in hardware, software, or a combination thereof, includes input stream decoding portion 42A, motion compensation block 44A, adder 46A, frame buffer 58, and display device 48. Input stream decoding portion 42A receives the intermediate video bitstream and provides blocks of staticly decompressed video information to adder 46A. Motion compensation block 44A receives motion information and provides motion-compensated pixels to adder 46A. Adder 46A receives the staticly decompressed video information and the motion-compensated pixels and provides decompressed pixels to frame buffer 58, which then provides the information to display 48.

Input stream decoding portion 42A includes input buffer 50A, inverse zig-zag and quantizer (IZZQ) block 54A and inverse discrete cosine transform (IDCT) block 56A. A controller 200A receives information from the input buffer 50A and provides control information conveyed on control bus 202 to other blocks within the decoder system, including IZZT block 54A, IDCT block 56A, and motion compensation block 44A. Motion compensation block 44A communicates with a frame memory 203A used for storing motion vectors from the previously decoded frame. Frame buffer 58 captures a display frame as it is decoded and assembled macroblock by macroblock, and allows information provided by adder 46 to be rasterized prior to display by display device 48.

In operation, input buffer 50 receives the intermediate video bitstream as, for example, read from a hard disk (not shown). Input buffer 50A buffers this intermediate video bitstream to an output conveyed on node 201 to both IZZT block 54A and to controller 200A. No VLC decoder is present, as was shown in FIG. 3, because the intermediate video bitstream is a partially-decoded form of the original compressed video bitstream, and as such the VLC codes are usually decoded into fixed-length codes. IZZQ block 54A then decodes the buffered video bitstream to provide a zig-zag decoded and dequantized signal, as discussed previously. This zig-zag decoded and dequantized signal is then provided to IDCT block 56 which performs an inverse discrete cosine transform on the zig-zag decoded and dequantized video signal on a block by block basis to provide a block of staticly decompressed pixel values.

The controller 200A receives the buffered video bitstream from the input buffer 50A and controls the processing of the video bitstream by the remaining blocks of the video decoder system. Information coded into the intermediate video bitstream which indicates ways in which the processing speed of the video information may be increased is passed by controller 200A directly to affected blocks within the system 40A. For example, memory 55A is utilized to store previously decoded IDCT coefficients from the previous frame, and memory 203A is used to store motion vectors and other necessary information from the previously decoded frame.

The intermediate video bitstream may contain a combination of partially-decoded information from the compressed video bitstream, as well as information useful for increasing the processing speed. The intermediate video bitstream may be stored on a system hard disk where it may be read much faster than if stored on a CD-ROM and may be deleted when not needed. It occupies more storage space than the compressed video bitstream, but with hard disk costs continuing to drop, the cost to store the intermediate video bitstream is low and getting lower with each passing year. The intermediate video bitstream may be played back at higher frame rates on slower systems than is achievable using the compressed video bitstream. Further, the intermediate video bitstream may be generated by a preprocessor which is executed either by a user before playback or by a video provider.

The level of preprocessing used to generate the intermediate video bitstream may be either user-selectable or may be automatically selected based upon the processor performance level of the playback processor. There are numerous examples of specific preprocessing results which may be incorporated into the intermediate video bitstream. As a first example, the preprocessor can convert all variable-length codes into fixed-length codes to eliminate the large overhead associated with decoding the VLC codes. Similarly, the preprocessor can measure the actual distribution of VLC codes within a compressed video bitstream and determine an optimal method to decode the VLC codes during playback. Such an optimal method is then encoded into the intermediate video bitstream.

As a second example, the preprocessor can identify areas within a frame which may be processed at a lower spatial resolution and encode the identity of such areas and the corresponding resolution for each area into the intermediate video bitstream for use by the video decoder during a subsequent playback.

As a third example particularly appropriate for an MPEG compressed video bitstream, the preprocessor can identify a macroblock within a frame which may be generated by reusing a corresponding macroblock within a previous frame. This may be accomplished, for example, by encoding one bit for each macroblock within the intermediate video bitstream which signifies whether to perform any computations on the macroblock or to simply use the corresponding macroblock from the previous frame. Examples of such identifiable macroblocks include those marked as skipped macroblocks, those which have a sufficiently small motion vector, and those having a sufficiently similar motion vector compared to the corresponding macroblock within the previous frame. Such a motion vector comparison may be performed by resolving the total magnitude of the actual motion vector itself, and comparing to a threshold distance, or alternatively, may computationally be more easily performed by simply comparing each of the $\Delta X$, $\Delta Y$ terms against a one-dimensional threshold value. Other methods may also be employed to determine a suitable threshold for a "sufficiently small" motion vector difference.

As a fourth example, a preprocessor can embed a "stream directory" within the intermediate video bitstream and which directory contains offsets marking the starting points, for example, for I-frames, P-frames, B-frames, slices, and starting points of macroblocks after skips of macroblocks. Such a capability allows a "VLC fast forward" which enables a decoder operating on the intermediate video bitstream to rapidly skip past frames or macroblocks without parsing and decoding the VLC bitstream when necessary to speed processing.

As a fifth example, the preprocessor can identify blocks for which the IDCT does not need to be computed to generate error terms. Examples of such blocks include those having only a small number of non-zero DCT coefficients, and those having only high frequency coefficients present.

Figure 8:
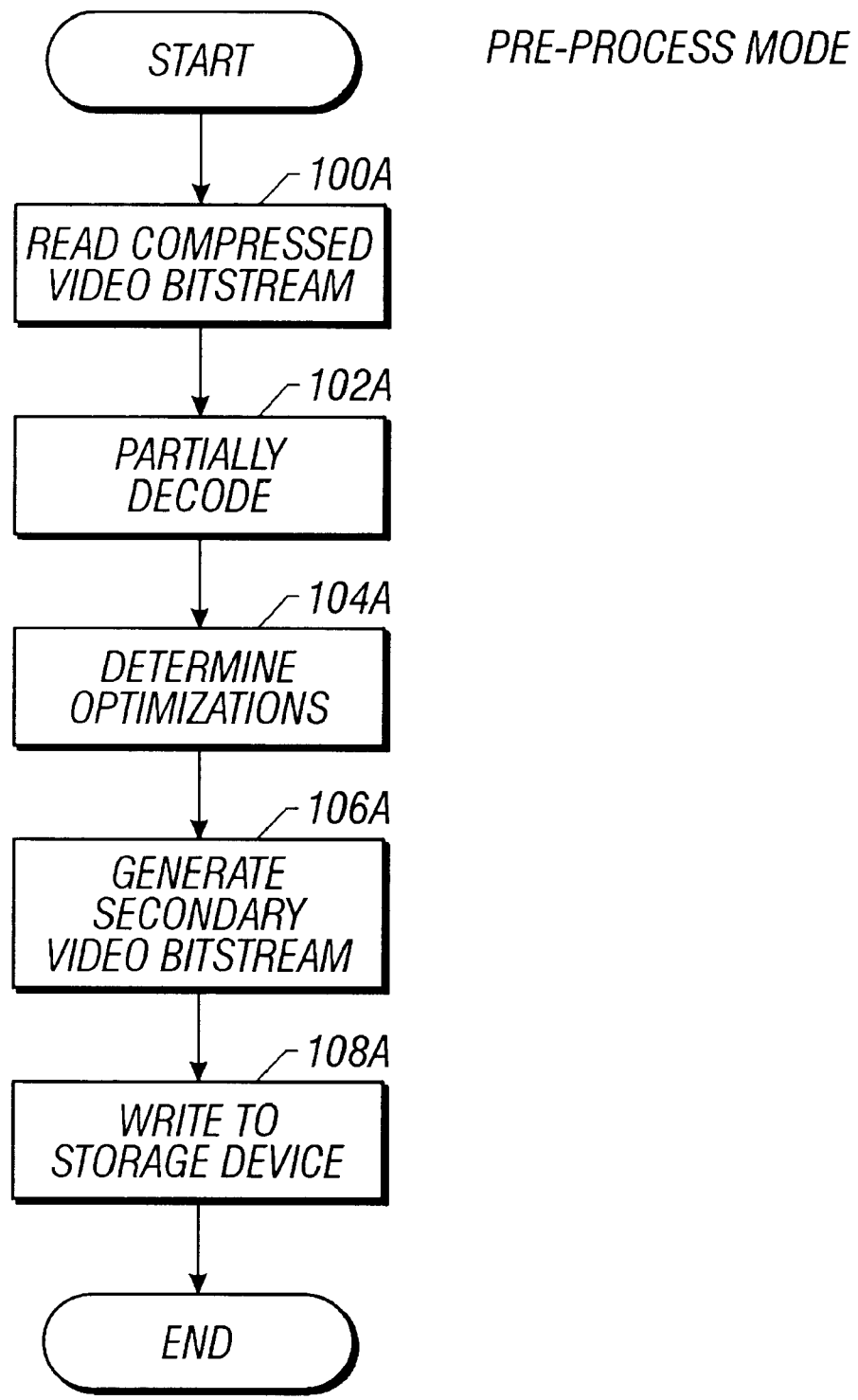
FIG. 8 illustrates a flow chart depicting one embodiment of a method for preprocessing a compressed video bitstream to generate a secondary video bitstream.
Figure 9:
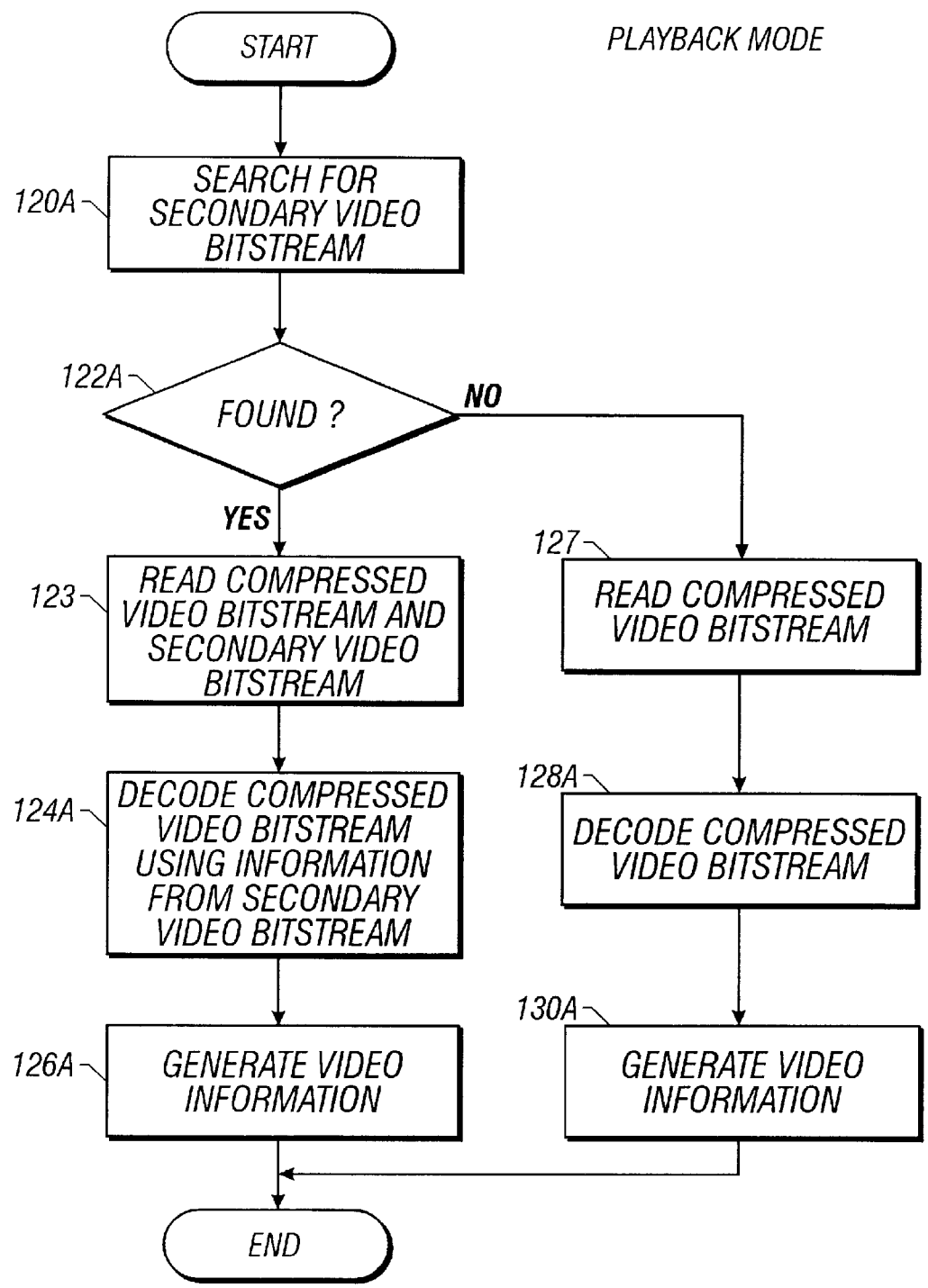
FIG. 9 illustrates a flow chart depicting one embodiment of a playback method utilizing a compressed video bitstream and a secondary video bitstream.

A method for reducing the processor performance required to display video information corresponding to a compressed video bitstream by using a secondary video bitstream is described by the flowcharts shown in FIGS. 8 and 9. Referring to FIG. 8 which describes a Preprocess (or Profile) Mode, a video processor, such as for example video preprocessor 71, first reads the compressed video bitstream, such as an MPEG bitstream, at step 100A. The compressed video bitstream is then decoded at step 102A. Such decoding may either be a partial decoding or a more extensive decoding. An example of such a partial decoding includes converting the VLC codes into fixed-length codes. At step 104A, the decoded video bitstream is analyzed to determine ways in which the processing may be optimized to reduce processor requirements during a subsequent video decoding operation. Next, at step 106A a secondary video bitstream is generated which may be used, during playback, along with the compressed video bitstream to enable a decoder system to generate the corresponding video information while requiring less processor performance then if decoding only the original compressed video bitstream alone. Lastly, at step 108A, the secondary video bitstream is written to a storage device, so that it may be read and decoded during a subsequent playback operation.

FIG. 9 shows a flowchart describing a playback mode corresponding to the preprocess mode shown in FIG. 8. At step 120A the method first searches for a secondary video bitstream that may be stored on a storage device as a result of a previous preprocess mode operation. Step 122A tests for such a search, and if a secondary video bitstream file is found, then control proceeds to step 123, at which step both the compressed video bitstream and the secondary video bitstream are simultaneously read. At step 124A the compressed video bitstream is decoded using facilitating information from the secondary video bitstream, followed by the step of generating the video information for display at step 126A. Alternatively, if at step 122A the secondary video bitstream is not found, then control proceeds to step 127, at which step the compressed video bitstream is read, followed by step 128A, at which step the compressed video bitstream is decoded, followed by the step of generating the video information for display at step 130A.

Figure 10:
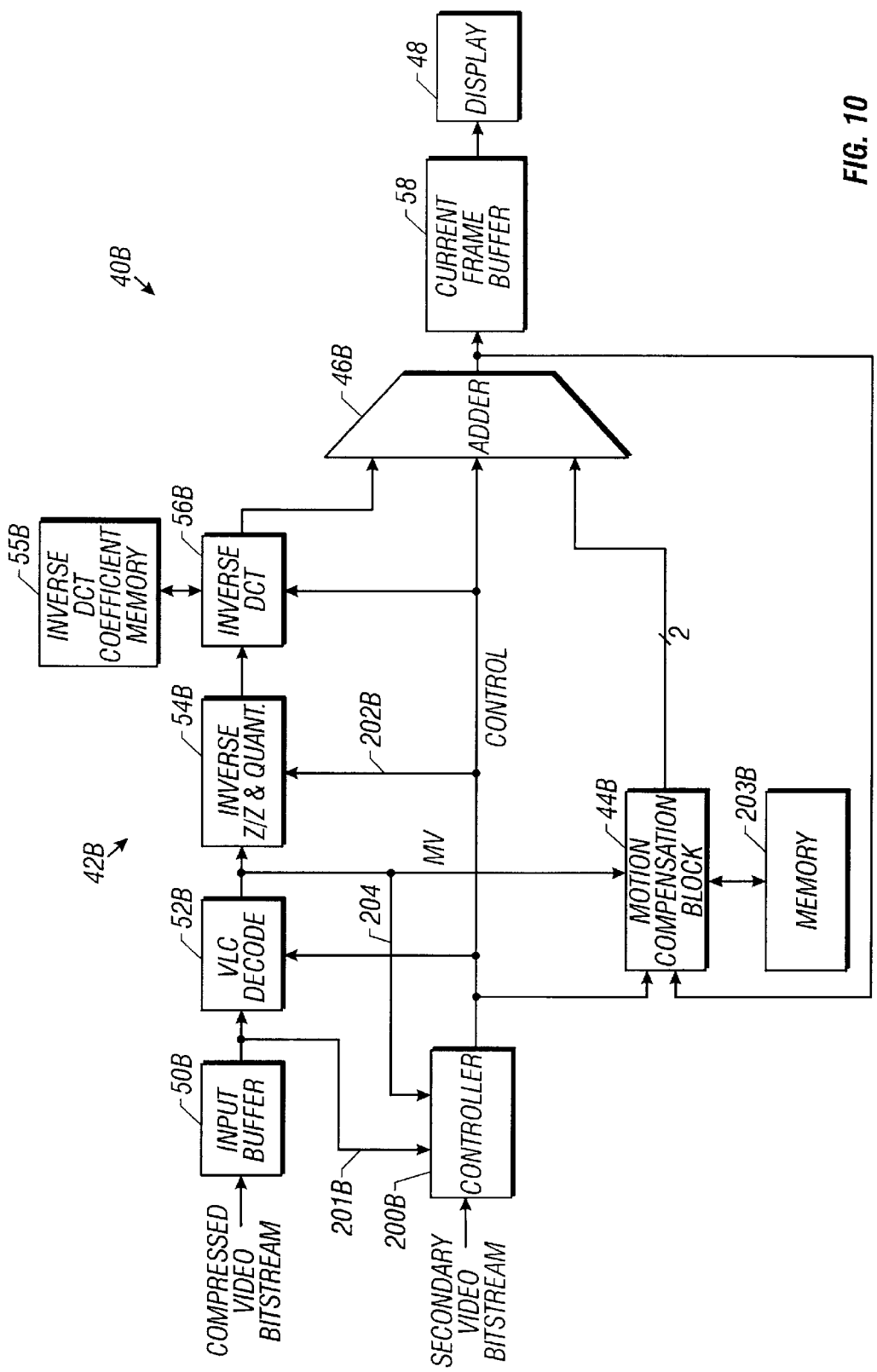
FIG. 10 shows a block diagram of a video decoder system suitable for decoding a compressed video bitstream by using a secondary video bitstream.

A conceptual system for decoding a secondary video bitstream as described above is shown schematically in FIG. 10. Video system 40B, which may be implemented either in hardware, software, or a combination thereof, includes input stream decoding portion 42B, controller 200B, motion compensation block 44B, adder 46B, frame buffer 58, and display device 48. Input stream decoding portion 42B receives the compressed video bitstream and provides blocks of staticly decompressed video information to adder 46B. Motion compensation block 44B receives motion information (for example, motion vectors) and provides motion-compensated pixels to adder 46B. Adder 46B receives the staticly decompressed video information and the motion-compensated pixels and provides decompressed pixels to frame buffer 58, which then provides the information to display 48.

Input stream decoding portion 42B includes input buffer 50B, VLC decoder 52B, inverse zig-zag and quantizer (IZZQ) block 54B and inverse discrete cosine transform (IDCT) block 56B. Controller 200B receives the secondary video bitstream and also receives information from input buffer 50B and conveyed on bus 201B, and provides control information conveyed on control bus 202B to other blocks within the decoder system, including VLC decoder 52B, IZZT block 54B, IDCT block 56B, and motion compensation block 44B. Motion compensation block 44B communicates with a memory 203B used for storing motion vectors from the previously decoded frame. As before, frame buffer 58 captures a display frame as it is decoded and assembled macroblock by macroblock, and allows information provided by adder 46B to be rasterized prior to display by display device 48.

In operation, input buffer 50B receives the compressed video bitstream as read, for example, from a CD-ROM (not shown), and controller 200B receives the secondary video bitstream as read, for example, from a hard disk (not shown). Input buffer 50B buffers the compressed video bitstream to an output conveyed on node 201B to both VLC decoder 52B and to controller 200B. VLC decoder 52B, IZZQ block 54B, and IDCT block 56B are configured to decode a compressed video bitstream as previous described on FIG. 3. However, in addition each block receives control information conveyed on control bus 202B from controller 200B, which enables each block to optimize its respective function.

The controller 200B receives the secondary video bitstream and receives the buffered compressed video bitstream from the input buffer 50B and controls the processing of the video bitstream by the remaining blocks of the video decoder system. Information coded into the secondary video bitstream which indicates ways in which the processing speed of the video information may be increased is passed by controller 200B directly to affected blocks within the system 40B. For example, memory 55B is utilized to store previously decoded IDCT coefficients from the previous frame, and memory 203B is used to store motion vectors from the previously decoded frame.

The secondary video bitstream contains information useful for increasing the processing speed of the compressed video bitstream, and may be stored on a system hard disk where it may be read much faster than if stored on a CD-ROM, and may be deleted when not needed. Storing the additional secondary video bitstream requires more storage space than storing the compressed video bitstream alone, but with hard disk costs continuing to drop, the cost to store the secondary video bitstream is low and getting lower with each passing year. The secondary video bitstream allows higher frame rates during playback of the compressed video bitstream on slower systems than is achievable using only the compressed video bitstream. Further, the secondary video bitstream may be generated by a preprocessor which is executed either by a user before playback or by a video provider.

The level of preprocessing used to generate the secondary video bitstream may be either user-selectable or may be automatically selected based upon the processor performance level of the playback processor. There are numerous examples of specific preprocessing results which may be incorporated into the secondary video bitstream. For example, the preprocessor can measure the actual distribution of VLC codes within a compressed video bitstream and determine an optimal method to decode the VLC codes during playback. Such an optimal method is then encoded into the secondary video bitstream.

As a second example, the preprocessor can identify areas within a frame which may be processed at a lower spatial resolution and encode such areas and corresponding resolution into the secondary video bitstream for use by a video decoder during a subsequent playback.

As a third example particularly appropriate for an MPEG compressed video bitstream, the preprocessor can identify a macroblock within a frame which may be generated by reusing a corresponding macroblock within a previous frame. This may be accomplished, for example, by encoding one bit for each macroblock within the secondary video bitstream which signifies whether to perform any computations on the macroblock or to simply use the corresponding macroblock from the previous frame. Examples of such identifiable macroblocks include those marked as skipped macroblocks, those which have a sufficiently small motion vector, and those having a sufficiently similar motion vector compared to the corresponding macroblock within the previous frame. Such a motion vector comparison may be performed by resolving the total magnitude of the actual motion vector itself, and comparing to a threshold distance, or alternatively, may computationally be more easily performed by simply comparing each of the $\Delta X$, $\Delta Y$ terms against a one-dimensional threshold value. Other methods may also be employed to determine a suitable threshold for a "sufficiently small" motion vector difference.

As a fourth example, a preprocessor can encode a "stream directory" within the secondary video bitstream and which directory contains offsets marking the starting points within the compressed video bitstream, for example, for I-frames, P-frames, B-frames, slices, and starting points of macroblocks after skips of macroblocks. Such a capability allows a "VLC fast forward" which enables a decoder to rapidly skip past frames or macroblocks without parsing and decoding the VLC bitstream when necessary to speed processing.

As a fifth example, the preprocessor can identify blocks for which the IDCT does not need to be computed to generate error terms. Examples of such blocks include those having only a small number of non-zero DCT coefficients, and those having only high frequency coefficients present.

One especially significant advantage of this invention is a reduction in required computational power of a video decoder system suitable for playback of video information. Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture. Higher quality video playback is achievable using lower performance processors than with previous techniques. Further, specialized hardware such as a dedicated MPEG decoder board is not required to achieve the video playback quality afforded by this invention.

Another advantage of the present invention further reduces processor demands during decoding. Selecting the level of preprocessing (either selectable by user or automatically in expectation of playback machine performance) when generating either the intermediate or secondary video bitstream requires less processor performance during playback than techniques which adaptively adjust the level of video quality during playback.

Other Embodiments

Other embodiments are intended to fall within the following claims. For example, the various modules or portions of video preprocessor system 71 may be provided in either hardware or software or a combination thereof. For example, video preprocessor system 71 may be provided by software that is designed to be executed on a general purpose processor system. As an additional example, IDCT block 56 may be configured as a microprocessor which is adapted to execute an inverse DCT algorithm. Conversely, video preprocessor system 71 may be implemented in a more traditional special purpose hardware system, optimized to perform the described functions typically using dedicated hardware units.

Also, for example, while several aspects of the present invention are set forth with reference to MPEG video compression, other similar compression schemes are equally contemplated and are intended to fall within the scope of the following claims.

What is claimed is:

1. A method of reducing processor performance requirements during playback decoding of a frame of video information corresponding to a compressed video bitstream comprising:

providing a plurality of preprocessing functions;

selecting at least one of the plurality of preprocessing functions based upon a desired performance level of the system during playback decoding of the frame of video information;

preprocessing the compressed video bitstream to generate an intermediate video bitstream different from the compressed video bitstream, the preprocessing using the at least one of the plurality of preprocessing functions, the intermediate video bitstream requiring less processor performance to decode the frame of video information during playback than the compressed video bitstream, the preprocessing leaving the compressed video bitstream intact and available for decoding; and storing the intermediate video bitstream for subsequent playback.

2. A method as in claim 1 wherein one of the plurality of preprocessing functions includes converting variable-length codes encountered in the compressed video bitstream into fixed-length codes within the intermediate video bitstream.

3. A method as in claim 1 wherein one of the plurality of preprocessing functions includes:
analyzing a distribution of variable-length codes encountered in the compressed video bitstream;
determining an optimal method to decode the variable-length codes during real time playback; and
encoding said optimal method into the intermediate video bitstream.

4. A method as in claim 1 wherein one of the plurality of preprocessing functions includes:
analyzing a frame to identify areas which may each be processed at a corresponding reduced spatial resolution, and
encoding each of said areas and said reduced spatial resolution corresponding thereto into the intermediate video bitstream.

5. A method as in claim 1 wherein the compressed video bitstream comprises an MPEG bitstream.

6. A method as in claim 5 wherein one of the plurality of preprocessing functions includes analyzing a sequence of frames to identify a macroblock within a frame which may be generated by reusing a corresponding macroblock within a previous frame.

7. A method as in claim 6 wherein said identified macroblock is a block identified from the group consisting of a skipped macroblock, a macroblock having a sufficiently small motion vector, and a macroblock having a sufficiently similar motion vector compared to the corresponding macroblock within the previous frame.

8. A method as in claim 5 wherein one of the plurality of preprocessing functions includes:
analyzing the compressed video bitstream to locate a plurality of frame starting points;
encoding into the intermediate video bitstream a frame starting point directory corresponding thereto, said directory containing information for quickly skipping to any one of the plurality of frame starting points during playback.

9. A method as in claim 5 wherein gone of the plurality of preprocessing functions includes:
analyzing the compressed video bitstream to locate blocks for which a corresponding IDCT need not be computed; and
encoding said located blocks into the intermediate video bitstream.

10. A method as in claim 9 wherein said located blocks are each chosen from the group consisting of a block having only a small number of non-zero coefficients, and a block having only high-frequency coefficients.

11. A method as in claim 1 further comprising decoding the intermediate video bitstream to generate the video information corresponding to the compressed video bitstream.

12. A method as in claim 1 further comprising:
searching first, during playback, for an intermediate video bitstream corresponding to the compressed video bitstream, and if found, then the step of decoding the intermediate video bitstream to generate a video bitstream corresponding to the compressed video bitstream; and
searching next for the compressed video bitstream, and if found, then the step of decoding the compressed video bitstream to generate video information corresponding thereto.

13. In a system for decoding a compressed video bitstream, a method of reducing processor performance requirements during playback decoding of a frame of video information corresponding to the compressed video bitstream, comprising:
providing a plurality of preprocessing functions;
selecting at least one of a plurality of preprocessing functions based upon a desired performance level of the system during playback decoding of the frame of video information;
preprocessing the compressed video bitstream according to the particular performance level, when in a preprocess mode, to generate an intermediate video bitstream different from the compressed video bitstream, the preprocessing using the at least one of the plurality of preprocessing functions, the intermediate video bitstream requiring less processor performance to decode than the compressed video bitstream, the preprocessing being based upon the selecting, the preprocessing leaving the compressed video bitstream intact and available for decoding;
storing the intermediate video bitstream for use during a subsequent playback mode; and
decoding one of the intermediate video bitstream and the compressed video bitstream, when in the playback mode, to generate the frame of video information corresponding to the compressed video bitstream.

14. A method as in claim 13 wherein decoding the intermediate video bitstream requires less processor performance for a given level of playback quality than would decoding the compressed video bitstream corresponding thereto.

15. A method as in claim 13 wherein decoding the intermediate video bitstream requires less processor performance for a given frame rate than would decoding the compressed video bitstream corresponding thereto.

16. A method as in claim 13 wherein the selecting is performed by a user.

17. A method as in claim 13 wherein the selecting is performed automatically.

18. A method as in claim 13 wherein of the plurality of preprocessing functions includes converting variable-length codes encountered in the compressed video bitstream into fixed-length codes within the intermediate video bitstream.

19. A method as in claim 13 wherein one of the plurality of preprocessing functions includes:
analyzing a distribution of variable-length codes encountered in the compressed video bitstream;
determining an optimal method to decode the variable-length codes during the real time playback mode; and
encoding said optimal method into the intermediate video bitstream.

20. A method as in claim 13 wherein on of the plurality of preprocessing functions includes:
analyzing a fame to identify areas which may each be processed at a corresponding reduced spatial resolution; and
encoding each of said areas and said reduced spatial resolution corresponding thereto into the intermediate video bitstream.

21. A method as in claim 13 wherein the compressed video bitstream comprises an MPEG bitstream.

22. A method as in claim 21 wherein one of the plurality of preprocessing functions includes analyzing a sequence of frames to identify a macroblock within a frame which may be generated by reusing a corresponding macroblock within a previous frame.

23. A method as in claim 22 wherein said identified macroblock is a skipped macroblock.

24. A method as in claim 22 wherein said identified macroblock is a macroblock having a sufficiently small motion vector.

25. A method as in claim 22 wherein said identified macroblock is a macroblock having a sufficiently similar motion vector compared to the corresponding macroblock within the previous frame.

26. A method as in claim 21 wherein one of plurality of preprocessing functions includes:

analyzing the compressed video bitstream to locate a plurality of frame starting points; and encoding into the intermediate video bitstream a frame starting point directory corresponding thereto, said directory containing information for quickly skipping to any one of the plurality of frame starting points during the playback mode.

27. A method as in claim 21 wherein one of plurality of the preprocessing functions includes:

analyzing the compressed video bits to locate block for which a corresponding IDCT need not be computed; and encoding said located blocks into the intermediate video bitstream.

28. A method as in claim 27 wherein each of said located blocks is a block having only a small number of non-zero coefficients.

29. A method as in claim 27 wherein each of said located blocks is a block having only high-frequency coefficients.

30. In a system for generating a frame of video information corresponding to a compressed video bitstream, an apparatus comprising:

a decoder for decoding the compressed video bitstream, when in a preprocess mode, the preprocess mode providing a plurality of preprocessing functions and selecting at least one of the plurality of preprocessing functions based upon a desired performance level of the system during playback decoding of the frame of video information, the at least one of the plurality of preprocessing functions being used to optimize processor performance during playback;

an analyzer block coupled to the decoder for analyzing the decoded compressed video bitstream to determine ways in which processor performance requirements during playback decoding of the frame of video information may be reduced; and a formatter coupled to the analyzer block for generating an intermediate video bitstream by incorporating information from the compressed video bitstream and further incorporating said ways, the formatter leaving the compressed video bitstream intact and available for decoding.

31. An apparatus as in claim 30 further comprising a second decoder for decoding one of the intermediate video bitstream and the compressed video bitstream, when in a playback mode, to generate the video information corresponding to the compressed video bitstream.

32. In a system for generating video information corresponding to a compressed video bitstream, an apparatus for reducing processor performance requirements during playback of the video information corresponding to the compressed video bitstream, comprising:

means for providing a plurality of preprocessing functions;

means for selecting at least one of the plurality of preprocessing functions based upon a desired performance level of the system during playback decoding of the frame of video information;

means for preprocessing the compressed video bitstream according to the particular performance level, when in a preprocess mode, to generate an intermediate video bitstream different from the compressed video bitstream, said intermediate video bitstream requiring less processor performance to decode than the compressed video bitstream, the means for preprocessing using the at least one of the plurality of preprocessing functions, the at least one of the plurality of preprocessing functions being used to optimize processor performance during playback, the means for preprocessing leaving the compressed video bitstream intact and available for decoding;

means for storing the intermediate video bitstream for use during a subsequent playback mode; and means for decoding one of the intermediate video bitstream and the compressed video bitstream, when in the playback mode, to generate the frame of video information corresponding to the compressed video bitstream.

33. An apparatus as in claim 32 wherein one of the plurality of preprocessing functions includes means for converting variable-length codes encountered in the compressed video bitstream into fixed-length codes within the intermediate video bitstream.

34. An apparatus as in claim 32 wherein one of the plurality of preprocessing functions includes:

means for analyzing a distribution of variable-length codes encountered in the compressed video bitstream;

means for determining an optimal method to decode the variable-length codes during the playback mode; and means for encoding said optimal method into the intermediate video bitstream.

35. An apparatus as in claim 32 wherein one of the plurality of preprocessing functions includes:

means for identifying areas within a frame which may each be processed at a corresponding reduced spatial resolution; and means for encoding each of said areas and said reduced spatial resolution corresponding hereto into the intermediate video bitstream.

36. An apparatus as in claim 32 wherein the compressed video bitstream comprises an MPEG bitstream.

37. An apparatus as in claim 36 wherein one of the plurality of preprocessing functions includes means for analyzing a sequence of frames to identify a macroblock within a frame which may be generated by reusing a corresponding macroblock within a previous frame.

38. An apparatus as in claim 37 wherein one of the plurality of preprocessing functions includes means for identifying a skipped macroblock.

39. An apparatus as in claim 36 wherein one of the plurality of preprocessing functions includes means for identifying a macroblock having a sufficiently small motion vector.

40. An apparatus as in claim 37 wherein one of the plurality of preprocessing functions includes means for identifying a macroblock having a sufficiently similar motion vector compared to the corresponding macroblock within the previous frame.

41. An apparatus as in claim 36 wherein one of the plurality of preprocessing functions includes:

means for locating within the compressed video bitstream a plurality of frame stating points; and means for encoding into the intermediate video bitstream a frame starting point directory corresponding thereto, said directory containing information for quickly skipping to any one of the plurality of frame starting points during the playback mode.

42. An apparatus as in claim 36 wherein one of the plurality of preprocessing functions includes:

means for locating within the compressed video bitstream blocks for which a corresponding IDCT need not be computed; and means for encoding said located blocks into the intermediate video bitstream.

43. An apparatus as in claim 42 wherein said one of the plurality of preprocessing functions further comprises means for locating blocks having only a small number of non-zero coefficients.

44. An apparatus as in claim 43 wherein said one of the plurality of preprocessing functions further comprises means for locating blocks having only high-frequency coefficients.

* * * * *

UNITED STATES PATENT AND TRADEMARK OFFICE
CERTIFICATE OF CORRECTION

PATENT NO.     : 6,075,918
ISSUE DATE     : June 13, 2000
INVENTOR(S)    : Liu, Yi; Strongin, Geoffrey S.; Tucker, Michael R.

It is certified that error appears in the above-identified patent and that said Letters Patent is hereby corrected as shown below:

Col. 13, line 40, delete "gone" and insert -one-.
Col. 16, line 42, delete "hereto" and insert –thereto–.

Signed and Sealed this

First Day of May, 2001

Attest:

NICHOLAS P. GODICI

*Attesting Officer*    *Acting Director of the United States Patent and Trademark Office*